United States Patent
Leistner et al.

(10) Patent No.: US 9,800,439 B2
(45) Date of Patent: Oct. 24, 2017

(54) APPARATUS AND METHOD FOR DIGITAL-TO-TIME CONVERTER SPUR DITHERING

(71) Applicant: Intel Corporation, Santa Clara, CA (US)

(72) Inventors: Andreas Jörn Leistner, Grasbrunn (DE); Georgios Palaskas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 14/577,885

(22) Filed: Dec. 19, 2014

(65) Prior Publication Data

US 2016/0182262 A1   Jun. 23, 2016

(51) Int. Cl.
| | |
|---|---|
| *H04L 25/08* | (2006.01) |
| *G06F 1/025* | (2006.01) |
| *H04B 15/06* | (2006.01) |
| *H04J 11/00* | (2006.01) |
| *H04L 7/00* | (2006.01) |
| *H04L 7/033* | (2006.01) |
| *H04L 27/12* | (2006.01) |

(52) U.S. Cl.
CPC ............. *H04L 25/08* (2013.01); *G06F 1/025* (2013.01); *H04B 15/06* (2013.01); *H04J 11/0063* (2013.01); *H04L 7/0091* (2013.01); *H04L 7/0331* (2013.01); *H04L 27/122* (2013.01); *H04J 2011/0096* (2013.01)

(58) Field of Classification Search
CPC ............................ G06F 1/025; G06F 2211/902
See application file for complete search history.

(56) References Cited

U.S. PATENT DOCUMENTS

| | | | |
|---|---|---|---|
| 5,963,157 A | 10/1999 | Smith | |
| 7,421,464 B2 * | 9/2008 | Gradishar | ............... G06F 1/025 708/271 |
| 2004/0210611 A1 | 10/2004 | Gradishar et al. | |
| 2006/0069707 A1 | 3/2006 | Gradishar et al. | |

(Continued)

FOREIGN PATENT DOCUMENTS

| | | |
|---|---|---|
| CN | 105721367 A | 6/2016 |
| TW | 201637407 A | 10/2016 |

OTHER PUBLICATIONS

"European Application Serial No. 15194820.5, Extended European Search Report mailed May 20, 2016", 6 pgs.

*Primary Examiner* — Chandrahas Patel
(74) *Attorney, Agent, or Firm* — Schwegman Lundberg & Woessner, P.A.

(57) ABSTRACT

Apparatus and methods for disrupting or preventing periodicity in DTC circuits are provided. In an example, a communication circuit can include a digital-to-time converter (DTC) and a processing path coupled to the DTC. The DTC can be configured to receive reference information, modulation information and first dither information, and to provide a modulated signal using the reference information, the modulation information and the first dither information. The processing path can be configured to receive second dither information and to cancel the first dither information using the second dither information, wherein the DTC is configured to disrupt processing periodicity of the communication circuit using the first dither information.

19 Claims, 4 Drawing Sheets

(56) References Cited

U.S. PATENT DOCUMENTS

| | | | |
|---|---|---|---|
| 2012/0176174 A1* | 7/2012 | Webb, III | G06F 1/0321 327/237 |
| 2015/0036509 A1* | 2/2015 | Lopes | H04W 16/10 370/241.1 |
| 2015/0091384 A1* | 4/2015 | Madoglio | H02J 17/00 307/104 |

* cited by examiner

APPARATUS AND METHOD FOR DIGITAL-TO-TIME CONVERTER SPUR DITHERING

TECHNICAL FIELD

The present subject matter generally relates to digital-to-time converter (DTC) circuits and, in particular, to apparatus and methods for breaking or preventing temporal periodicity in local oscillator-type generating circuits such as DTC circuits to avoid spurs on the output of such circuits. Some examples relate to wireless transceivers. Some examples relate to frequency synthesis. Some examples relate to carrier aggregation and multi-input/multi-output (MIMO) communication. Some embodiments relate to wireless networks, including cellular networks, such as 3GPP LTE networks, and WLANs including IEEE 802.11 networks.

BACKGROUND

Digital-to-time converters (DTCs) can be used to generate frequency or phase modulated clock signals in various radio architectures including polar and quadrature communication schemes. DTCs can provide smaller less energy consuming implementations of carrier aggregation and multi-input/multi-output (MIMO) technologies. In addition, such technologies can be provided with only a single reference clock as DTCs can be used to provide frequency generation based on the single reference clock. However, periodicity associated with DTC based frequency generation can cause spectral spurs that can impact standard compliance of some DTC based communication equipment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Several factors can cause temporal periodicity within a DTC processing path, including but not limited to, generation of (static) frequency offset by phase rotation, processing a repeating pattern of data or performing certain processing tasks in a repeating pattern. Repeating processing or data patterns along with quantization error or circuit non-linearity can concentrate power of the error signal at discrete frequencies, thus forming spurs. Noise shaping has been implemented to dissipate the energy of the spurs and can include adding generic noise to a communication processing path in an effort to break-up the periodicity. However, as described above, noise shaping adds noise to the transmission signal and thus, the amplitude of the added noise must be small to avoid violating other noise limits. Although noise shaping can alleviate spurs in some situations, the amplitude limit of noise-shaping does not provide noise-shaping as a robust and predictable solution for reducing or eliminating spectral spurs in DTC-based communication systems.

Figure 1:
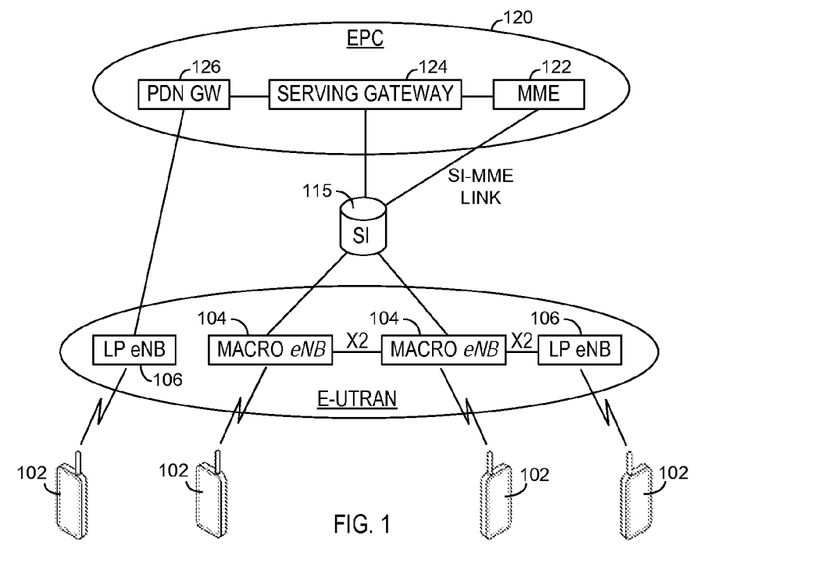
FIG. 1 shows a portion of an end-to-end network architecture in accordance with some examples of the present subject matter.

FIG. 1 shows a portion of an end-to-end network architecture of LTE (long term evolution) network with various components of the network in accordance with some embodiments. The network comprises a radio access network (RAN) (e.g., as depicted, the E-UTRAN or evolved universal terrestrial radio access network) and the core network (EPC) 120 coupled together through an S1 interface 115. Note that for convenience and brevity sake, only a portion of the core network, as well as the RAN, is shown.

The core (EPC) 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNB handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates a SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNB 104 (macro and micro) terminates the air interface protocol and is usually (if not always) the first point of contact for a UE 102. In some embodiments, an eNB 104 may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNB and the Serving GW, and the S1-MME, which is a signaling interface between the eNB and the MME. The X2 interface is the interface between eNBs (at least between most, as will be addressed below regarding micro eNBs). The X2 interface comprises two parts, the X2-C and X2-U. The X2-C is the control plane interface between eNBs, while the X2-U is the user plane interface between eNBs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 could be implemented with a picocell eNB since it is coupled to a macro eNB via an X2 interface. Picocell eNBs or other LP eNBs for that matter) may incorporate some or all functionality of a macro eNB. In some cases, this may be referred to as an access point base station or enterprise femtocell.

DTC-based frequency generation and modulation schemes are very attractive for modern radios because such architectures can provide improved area and power consumption characteristics compared with conventional analog architectures. In accordance with some embodiments, a UE 102 or an eNB 104,106 can include one or more DTC-based transmitters, one or more DTC-based receivers or a combination thereof.

Figure 2:
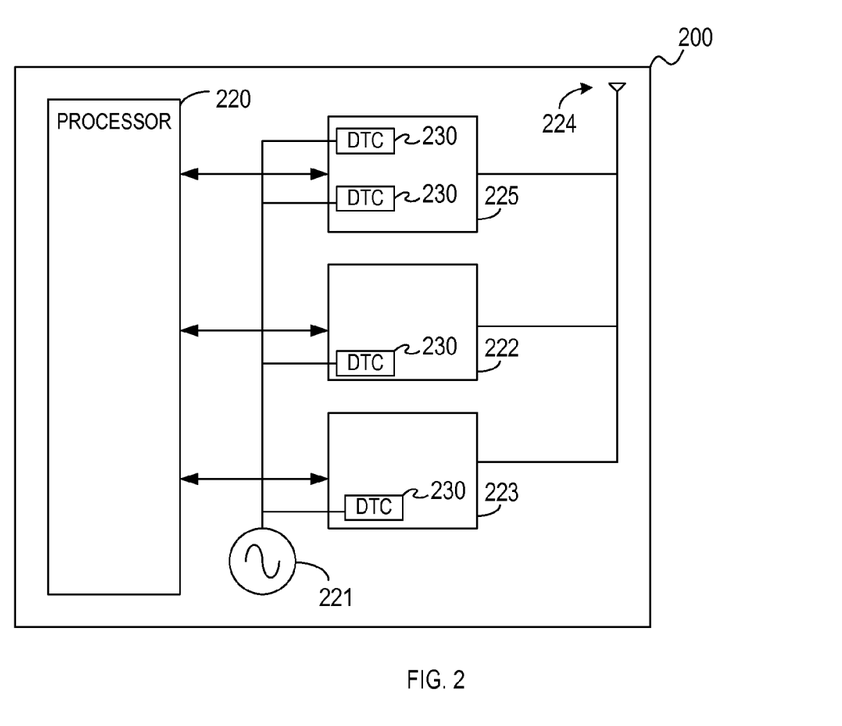
FIG. 2 illustrates generally a communication device according to various examples of the present subject matter.

FIG. 2 illustrates generally a communication device 200 according to various examples of the present subject matter. In certain examples, the communication device 200 can represent at least a portion of a communication network such as, but not limited to, a UE or eNB. In certain examples, the communicating device 200 can include multiple DTCs 230 for frequency generation and modulation. The communication device 200 can include, but is not limited to, a base station, eNB, UE, or mobile communication device. In certain examples, the communication device 200 can include a processor 220, a reference frequency source 221, a one or more transmitters 222 and one or more receivers 223, and one or more antennas 224. In some examples, a transceiver 225 can include a transmitter and receiver. DTCs 230 of the transmitters and receivers can receive reference frequency information from the reference frequency source 221 and can synthesize a local oscillator signal or radio frequency (RF) signal for use in modulating or de-modulating communication data over a wired or wireless network. Local oscillator generators or RF generators for each transmitter and each receiver can typically include phase locked-loops (PLLs) that include coils in the voltage controlled oscillator (VCO) or digital controlled oscillator (DCO) that take up a lot of chip area and do not significantly shrink in size with new generation communication technology and protocols. The DTCs 230 of the DTC-based communication device 200 allow for the digital generation of multiple, high-frequency clock signals without requiring multiple reference frequency generators. In addition to saving chip space, the DTC-based communication device 200 can avoid or reduce the inevitable coupling and spur generation associated with using multiple reference generators. In certain examples, where a DTC 230 primarily provides frequency synthesis, but also where the DTC 230 provides phase modulation, repeating processing sequences and repeating modulation data, among other things, can result in the processing path of the communication device establishing periodicity that can result in frequency spurs in the local oscillator signal generated by the DTC 230. A DTC can generate an output signal that exhibits some error compared to the ideal output signal of an ideal DTC due to quantization, non-linearity or other limitations of the implementation. In certain examples, when DTC operation shows some periodicity in time, power of this error signal can be concentrated at discrete frequencies and can be known as "spurs". In some applications, the spurs can significantly deteriorate the performance of a communication device or a channel of a communication system.

In certain examples, as shown below, dither information or one or more dither signals can be added to a DTC processing path at a first location and cancelled at a one or more other locations in the processing path. DTC dithering can be cancelled before or after the DTC in the signal path. Adding dither to the processing path can disrupt or interrupt the periodicity associated with the conditions discussed above and can ameliorate frequency spurs of the generated local oscillator signal. The dither signals or dither information can include information representative of a signal with non-constant instantaneous frequency, such as, but not limited to, signals with sinusoidal modulation or pseudo-random, spectrally shaped phase or frequency modulation. In some examples, a dither information generator can be part of the processor. In some examples, the dither information generator can be part of a transmitter, part of a receiver, or part of a transceiver. In some examples, a dither information generator 226 can be separate from the processor 220, transmitters 222, receivers 223 or transceivers 225.

In some embodiments, the communication device 200 (FIG. 2) may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the transmitter 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the communication device 200 may be part of a UE or eNB (FIG. 1) and may be configured to transmit and/or receive OFDM communication signals over a multicarrier communication channel in accordance with an orthogonal frequency division multiple access (OFDMA) technique. The OFDM signals may comprise a plurality of orthogonal subcarriers. In some broadband multicarrier embodiments, the UEs and eNBs may be part of a cellular broadband wireless access (BWA) network communication network, such a 3rd Generation Partnership Project (3GPP) Universal Terrestrial Radio Access Network (UTRAN) Long-Term-Evolution (LTE) or a Long-Term-Evolution (LTE) communication network, although the scope of the present subject matter is not limited in this respect.

In some embodiments, communication device 200 may be configured to receive OFDM communication signals over a multicarrier communication channel. The OFDM signals may comprise a plurality of orthogonal subcarriers. In some of these multicarrier embodiments, receiver 100 may be part of a wireless local area network (WLAN) communication station (STA) such as a wireless access point (AP), base station or a mobile device including a Wireless Fidelity (WiFi) device. In some of these embodiments, communication device 200 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs, although the scope of the present subject matter is not limited in this respect as they may also be suitable to transmit and/or receive communications in accordance with other techniques and standards.

In some other embodiments, communication device 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In the examples discussed above, as well as the examples discussed below, a DTC is used as part of a processing circuit to apply time-varying time/phase shift to incoming reference frequency information, sometimes referred to as an input local oscillator signal or input local oscillator information ($LO_{IN}$), to provide output frequency information for generating an output local oscillator signal, for example. Issues associated with periodicity/spurs can be related to generating frequency offset by applying rotating/periodic phase shift (and some non-ideality in this processing) and not to the DTC itself. It is understood that circuits other than a DTC, such as, but not limited to, digital-to-phase converters (DPCs), that can apply time-varying time/phase shift, can be used as part of the processing circuit instead of a DTC without departing from the scope of the present subject matter.

Figure 3:
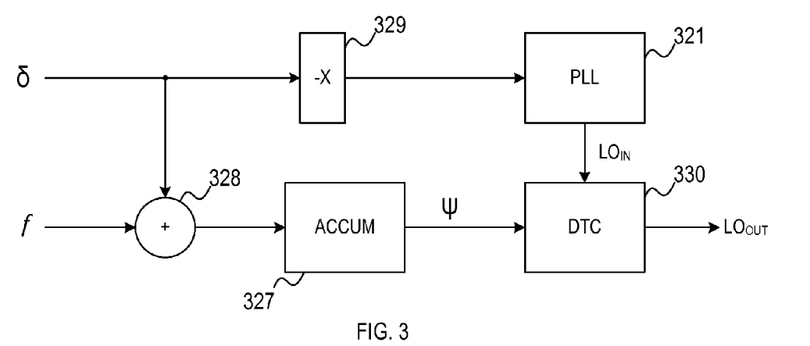
FIG. 3 illustrates generally a portion of a DTC-based communication device including spur dithering according to various examples of the present subject matter.

FIG. 3 illustrates generally a portion of an example DTC-based communication device including spur dithering according to various examples of the present subject matter. The example portion of the DTC-based communication device can include a PLL 321, an accumulator 327, and a DTC 330. The PLL 321 can provide a reference frequency or reference frequency information ($LO_{IN}$) to the DTC 330. The DTC 330 can receive the reference frequency information ($LO_{IN}$) and modulation information from the accumulator 327, such as accumulated phase sample information ($\psi$), and can provide a output local oscillator signal or output local oscillator information ($LO_{OUT}$) for a transmitter or receiver of the communication device. In certain examples, the accumulator 327 can integrate frequency sample information (f) and provide phase sample information ($\psi$) to the DTC. In certain examples, dither information ($\delta$) can be added to the processing path and then withdrawn from the processing path. The dither information ($\delta$) or signal can break up, disrupt or prevent periodicity that can occur in the processing path of the illustrated portion of the example DTC-based communication device. In the illustrated example of FIG. 3, the dither signal or dither information ($\delta$) can be added to the frequency sample information using a summing node 328 located prior to the accumulator 327. An inverter circuit 329 can receive the dither information ($\delta$) and can provide inverse dither information to the PLL 321. The PLL 321 can apply the inverse dither information to the reference frequency information ($LO_{IN}$) such that at the DTC 330 the dither information ($\delta$) can be canceled or withdrawn from the processing path by the inverse dither information. Because the dither signal is canceled from the DTC processing path, the dither signal can be larger than a signal used, for example, with noise shaping. In certain examples, the dither signal or dither information ($\delta$) can dominate or eliminate any ability for the processing path associated with the DTC 330 to manifest periodicity. In certain examples, the communication device including the portion 300 discussed above can be a UE 102 or an eNB 104, 106 as shown in FIG. 1.

Figure 4A:
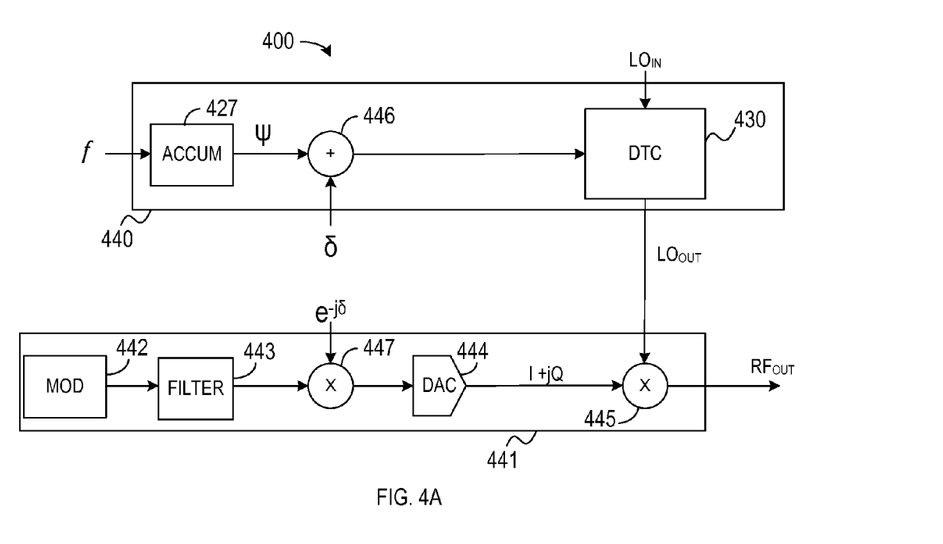
FIG. 4A illustrates generally a portion of an example quadrature transmitter according to various examples of the present subject matter.

FIG. 4A illustrates generally a portion 400 of an example quadrature transmitter according to various examples of the present subject matter. In certain examples, the portion 400 can include a frequency generator circuit 440 and a modulation processing path 441. The frequency generator circuit can include an accumulator 427 for receiving frequency sample information (f) and providing phase sample information ($\psi$) to a DTC 430. The DTC 430 can receive the phase sample information ($\psi$) and reference frequency information ($LO_{IN}$), from a PLL for example, and can provide an output local oscillator information or signal ($LO_{OUT}$) for the transmitter. The modulation processing path 441 can include a modulator 442 or a modulator 442 and a filter 443 to receive communication data and provide quadrature samples (I, Q) representing the communication data. A digital-to-analog converter (DAC) 444 can provide an analog representation (I+jQ) of the communication data to a mixer 445, and the mixer 445 can provide a RF signal ($RF_{OUT}$) using the output local oscillator signal ($LO_{OUT}$) combined with the analog representation (I+jQ) of the communication data.

In certain examples, a dither signal ($\delta$), or dither information, can be added, via a summing node 446 for example, to the phase sample information ($\psi$) to break up periodicity associated with using the DTC 430 to generate the output local oscillator signal ($LO_{OUT}$). A second mixer 447 can mix a complex representation ($e^{-j\delta}$) of the dither information ($\delta$) with the quadrature samples (I, Q) of the communication data such that when the analog representation (I+jQ) of the communication data is mixed with the output local oscillator signal ($LO_{OUT}$), the complex representation ($e^{-j\delta}$) of the dither information can cancel the dither information ($\delta$) such that little or no relic of the dither information ($\delta$) remains in the RF signal ($RF_{OUT}$). By injecting the dither information ($RF_{OUT}$) in the frequency generator circuit 440, periodicity can be broken and prevented in the DTC during frequency generation and the potential for spectral spurs associated with frequency generation processing can be robustly and predictably reduced or eliminated. In certain examples, the communication data can be communication data handled by UEs or eNBs of a communication network and the quadrature transmitter can be a transmitter of a UE 102 or an eNB 104, 106 as illustrated in FIG. 1.

Figure 4B:
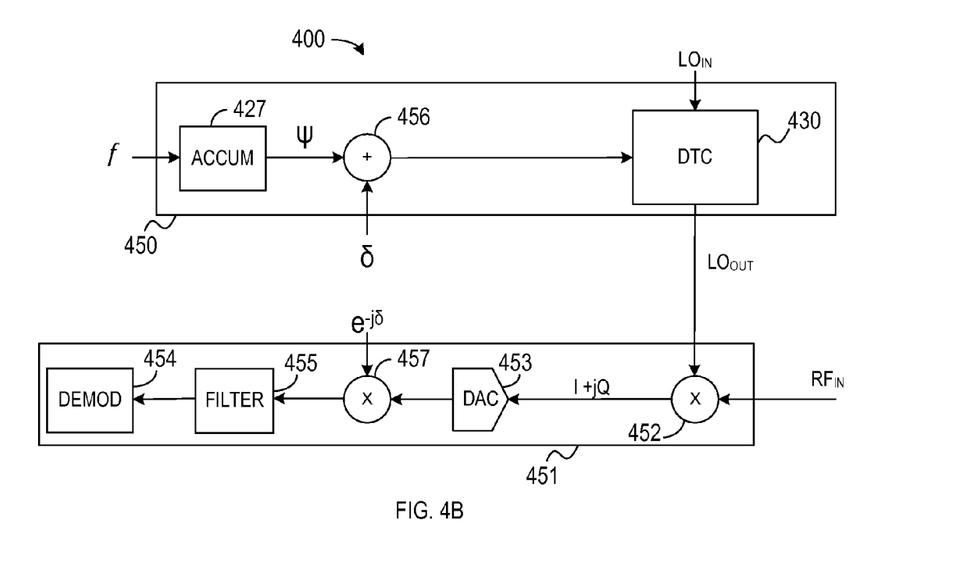
FIG. 4B illustrates generally a portion of an example quadrature receiver according to various examples of the present subject matter.

FIG. 4B illustrates generally a portion 400 of an example quadrature receiver according to various examples of the present subject matter. In certain examples, the portion 400 of the quadrature receiver can include a frequency generator circuit 450 and a demodulation or reception processing path 451. The frequency generator circuit 450 can include an accumulator 427 for receiving frequency sample information (f) and providing phase sample information ($\psi$) to a DTC 430. The DTC 430 can receive the phase sample information ($\psi$) and reference frequency information ($LO_{IN}$), from a PLL for example, and can provide output local oscillator information or a output local oscillator signal ($LO_{OUT}$) for the quadrature receiver. The demodulation processing path 451 can use a mixer 452 to extract an analog representation (I+jQ) of communication data from a received RF signal ($RF_{IN}$) such as an RF signal received at an antenna of a wireless communication device.

The demodulation processing path 451 can include an analog-to-digital converter (ADC) 453 to receive the analog representation (I+jQ) of the communication data from the mixer 452 and can provide quadrature samples (I, Q) representing the communication data. A demodulator 454, or a filter 455 and a demodulator 454, can receive the quadrature samples (I, Q) and can provide the communication data to a processor, such as a baseband processor of a communication device.

In certain examples, a dither signal ($\delta$), or dither information, can be added, via a summing node 456 for example, to the phase sample information ($\psi$) to break up periodicity associated with using the DTC 430 to generate the output local oscillator signal ($LO_{OUT}$). Simultaneously, a complex representation ($e^{-j\delta}$) of the dither signal ($\delta$) can be mixed, via a second mixer 457, with the quadrature samples (I, Q) of the communication data such that when the analog representation of the communication data (I+jQ) is mixed with the output local oscillator signal, the complex representation ($e^{-j\delta}$) of the dither signal ($\delta$) can cancel the dither signal ($\delta$) such that little or no relic of dither information remains in the quadrature samples (I, Q). By injecting the dither information in the frequency generator, periodicity can be broken and prevented during frequency generation and the potential for spectral spurs associated with frequency generation processing can be robustly and predictably reduced or eliminated. In certain examples, the communication data can be communication data handled by UEs or eNBs of a communication network and the quadrature transmitter can be a transmitter of a UE 102 or an eNB 104, 106 as illustrated in FIG. 1.

Figure 5:
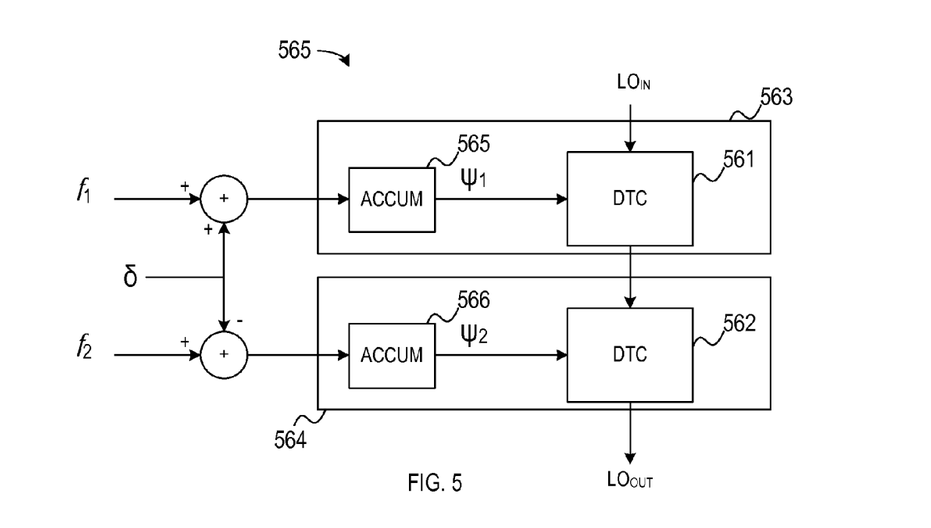
FIG. 5 illustrates generally a multiple DTC-based frequency generator circuit according to various examples of the present subject matter.

FIG. 5 illustrates generally a DTC-based frequency generator circuit 560 according to various examples of the present subject matter that employs more than one DTC 561, 562 to reduce or eliminate spurs. In certain examples, the frequency generator circuit 560 can include first and second DTC circuits 563, 564. In certain examples, the first DTC 561 can receive reference frequency information ($LO_{IN}$) and the second DTC 562 can be coupled to the output of the first DTC 561 to provide a output local oscillator signal ($LO_{OUT}$) for a downstream circuit, such as a transmitter or a receiver circuit. Each DTC circuit 563, 564 can include an accumulator 565, 566 to receive and integrate frequency offset information ($f_1, f_2$) and to provide phase information ($\psi_1, \psi_2$) such as phase samples to each DTC 561, 562. In some examples, the total frequency shift between the frequency of the reference frequency information ($LO_{IN}$) and the frequency of the output local oscillator signal ($LO_{OUT}$) can be split between first frequency offset information ($f_1$) received by the first DTC circuit 563 and second frequency offset information ($f_2$) received by the second DTC circuit 564. In some examples, a dither frequency samples ($\delta$) can be added to a processing path of the first DTC circuit 563 and subtracted from the processing path of the second DTC circuit 564 such that the impact of the dither samples can cancel each other at the output of the second DTC 562.

In some examples, the dither signal ($\delta$) or dither information can include dither phase shift samples that can be mixed with the first DTC processing path 563 after the first accumulator 565. Phase shift samples having opposite phase shift corresponding to the dither phase shift samples can be added to the second DTC processing path 564 after the second accumulator 566 such that most if not all the dither signal can be cancelled from the output of the second DTC 562. In certain examples, the frequency generator circuit 560 can be a frequency generator circuit for a UE 102 or an eNB 104, 106 as shown in FIG. 1.

The dither information ($\delta$) and corresponding dither cancelling information of the examples shown in FIGS. 3-5 can include information representative of a signal with non-constant instantaneous frequency, such as, but not limited to, signals with sinusoidal modulation or pseudo-random, spectrally shaped phase or frequency modulation. In certain examples, a system on a chip (SoC) that includes a transmitter, a receiver, or a combination therein can also include a dither generator to provide the dither information or dither signals as discussed above.

Figure 6:
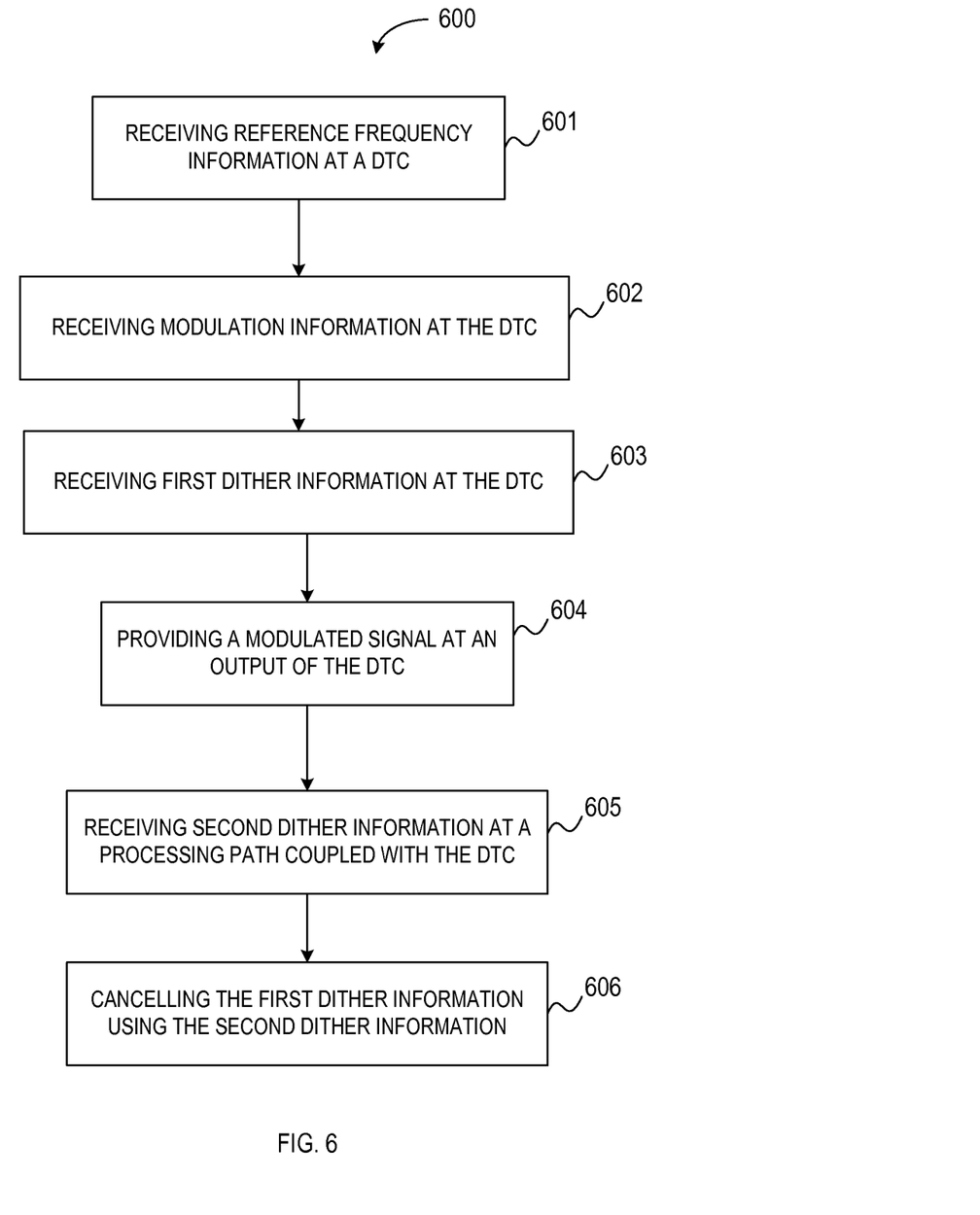
FIG. 6 illustrates generally a flowchart of a method of reducing spectral spurs of a DTC-based frequency generation or modulation circuit according to various examples of the present subject matter.

FIG. 6 illustrates general a flowchart of a method 600 of reducing spectral spurs of a DTC-based frequency generation or modulation circuit according to various examples of the present subject matter. In certain examples, the method 600 can include, at 601, receiving reference frequency information at a DTC. At 602, the DTC can receive modulation information, such as from a digital baseband processor, for example. At 603, first dither information can be received at the DTC. In some examples, the dither information can be received as part of the modulation information. In some examples, the first dither information can be received as part of the reference frequency information. At

604, the DTC can provide a modulated at an output of the DTC. At 605, second dither information can be received at a processing path associated or coupled with the DTC. In some examples, the processing path can include the DTC and the second dither information can be part of the modulation information. In some examples, the processing path can include a second DTC and the second dither information can be part of the modulation information for the second DTC. In some examples, the processing path can be a processing path for a transmitter, such as a wireless transmitter configured to transmit communication data using one or more antennas coupled to the wireless transmitter. In some examples, the processing path can be a processing path for a receiver, such as a wireless receiver configured to extract communication data from an RF signal received by one or more antennas coupled to the wireless receiver. In some examples, the examples, the transmitter or receiver can be a quadrature modulation device. In some examples, the transmitter or receiver can be a polar modulation device. At 606, the first dither information can be canceled using the second dither information. In some examples, a DTC can use second dither information received as part of the modulation information to cancel the first dither information received as part of the reference frequency information. In some examples, first dither information processed by a DTC and provided as part of an output local oscillator signal can be canceled using a mixer and second dither information provided as part of an analog or a digital representation of communication data. In certain examples, adding dither information to a processing path including a DTC and canceling the dither information using the DTC or a downstream portion of a coupled processing path can facilitate breaking up or preventing establishment of periodicity in the DTC-based processing path or circuit. It is understood that example method 600 is illustrative of a particular example and the order of steps of method 600 can be rearranged, and some of the steps being performed in parallel with other steps of the method 600 without departing from the scope of the present subject matter.

EXAMPLES AND ADDITIONAL NOTES

In Example 1, a communication circuit to reduce spur energy of a modulated signal can include a digital-to-time converter (DTC) configured to receive reference information, to receive modulation information, to receive first dither information and to provide the modulated signal using the reference information, the modulation information and the first dither information, and a processing path configured to receive second dither information and to cancel the first dither information using the second dither information. The first dither information can be configured to disrupt processing periodicity of the communication circuit to reduce spur energy.

In Example 2, the modulated signal of Example 1 optionally is an output local oscillator signal having a frequency different from a frequency of the reference information.

In Example 3, the communication circuit of any one of more of Examples 1-2 optionally includes a reference generator configured to receive the second dither information and to provide the reference information with the second dither information to the DTC.

In Example 4, the reference generator of any one of more of Examples 1-3 optionally includes a phase-locked loop (PLL).

In Example 5, the first dither information of any one of more of Examples 1-4 optionally is added to the modulation information.

In Example 6, the communication circuit of any one of more of Examples 1-2 optionally includes an accumulator coupled to the DTC and configured to integrate frequency sample information of the modulation information.

In Example 7, the first dither information of any one of more of Examples 1-6 optionally is added as frequency samples to the modulation information prior to the accumulator.

In Example 8, the first dither information of any one of more of Examples 1-7 optionally is added as phase samples to the modulation information after the accumulator.

In Example 9, the processing path of any one of more of Examples 1-8 optionally includes a quadrature transmission path configured receive the modulated signal as a local oscillator signal from the DTC and to mix quadrature communication data with the modulated signal to provide a radio frequency signal.

In Example 10, the processing path of any one of more of Examples 1-9 optionally includes a quadrature reception path configured receive the modulated signal as a local oscillator signal from the DTC and to extract quadrature communication data from a radio frequency signal using the modulated signal.

In Example 11, the processing path of any one of more of Examples 1-10 optionally includes a second DTC configured to receive an output of the DTC as second reference information.

In Example 12, the communication circuit of any one of more of Examples 1-11 optionally includes a dither information generator configured to generate the first dither information with non-constant instantaneous frequency.

In Example 13, the communication circuit of any one of more of Examples 1-12 optionally includes a dither information generator configured to generate the first dither information to include sinusoidal modulation information or pseudo-random, spectrally shaped phase or frequency modulation information.

In Example 14, a method of reducing spur energy of a modulated signal performed by a communication circuit can include receiving reference frequency information at a digital-to-time converter (DTC), receiving modulation information at the DTC, receiving first dither information at the DTC, providing the modulated signal using the reference information, the modulation information and the first dither information, receiving second dither information at a processing path coupled with the DTC, and cancelling the first dither information using the second dither information, wherein the first dither information is configured to disrupt processing periodicity of the communication circuit.

In Example 15, the receiving second dither information at the DTC of any one of more of Examples 1-14 optionally includes receiving the second dither information at a reference generator, the reference generator configured to provide the reference information with the second dither information to the DTC from the reference generator.

In Example 16, the method of any one of more of Examples 1-15 optionally includes adding the first dither information to the modulation information.

In Example 17, the adding the first dither information to the modulation information of any one of more of Examples 1-16 optionally includes adding the first dither information to the modulation information as frequency samples.

In Example 18, the adding the first dither information to the modulation information of any one of more of Examples 1-17 optionally includes adding the first dither information to the modulation information as phase samples.

In Example 19, the processing path of any one of more of Examples 1-18 optionally includes a quadrature transmission path and the method can further include receiving the modulated signal as a local oscillator signal from the DTC at the quadrature transmission path, and mixing quadrature communication data with the modulated signal to provide a radio frequency signal, wherein the mixing includes cancelling the first dither information using the second dither information.

In Example 20, the processing path of any one of more of Examples 1-19 optionally includes a quadrature reception path and the method can further include receiving the modulated signal as a local oscillator signal from the DTC at the quadrature reception path, and extracting quadrature communication data from a radio frequency signal using the modulated signal, wherein the mixing includes cancelling the first dither information using the second dither information.

In Example 21, the receiving second dither information at a processing path of any one of more of Examples 1-20 optionally includes receiving the second dither information at a second DTC, and receiving an output of the DTC as second reference frequency information at the second DTC.

In Example 22, a communication device can include processing circuitry configured to provide first communication data and to receive second communication data, a dither information generator configured to generate first dither information, and a communication circuit. The communication circuit can includes a digital-to-time converter (DTC) configured to receive reference information, to receive modulation information, to receive the first dither information and to provide a modulated signal using the reference information, the modulation information and the first dither information, and a processing path associated with the DTC and configured to receive at least one of the first communication data or the second communication data, to receive second dither information, and to cancel the first dither information using the second dither information, wherein the first dither information is configured to disrupt processing periodicity of the communication circuit.

In Example 23, the processing path of any one of more of Examples 1-22 optionally includes a transmission path and wherein the transmission path is configured to receive the modulated signal and to combine the first communication data with the communication data to provide a transmission signal.

In Example 24, the communication device of any one of more of Examples 1-23 optionally is user equipment (UE) and the transmission signal is an OFDMA signal configured for transmission in a 3GPP LTE network.

In Example 25, the communication device of any one of more of Examples 1-24 optionally is a station (STA) and the transmission signal is an OFDMA signal configured for transmission in an IEEE 802.11 network.

In Example 26, the processing path of any one of more of Examples 1-25 optionally includes a reception path and wherein the reception path is configured to receive the modulated signal and to extract the second communication data from a received communication signal.

In Example 27, the communication device of any one of more of Examples 1-26 optionally includes one or more antennas configured to transmit the first communication data and to receive the second communication data.

In Example 28, a communication circuit to reduce spur energy of a modulated signal can include means for apply time-varying time/phase shift to generate the modulated signal and configured to receive reference information, to receive modulation information, to receive first dither information and to provide the modulated signal using the reference information, the modulation information and the first dither information, and a processing path configured to receive second dither information and to cancel the first dither information using the second dither information. The first dither information can be configured to disrupt processing periodicity of the communication circuit to reduce spur energy.

Example 29 can include, or can optionally be combined with any portion or combination of any portions of any one or more of Examples 1 through 28 to include, subject matter that can include means for performing any one or more of the functions of Examples 1 through 28, or a machine-readable medium including instructions that, when performed by a machine, cause the machine to perform any one or more of the functions of Examples 1 through 28.

The above detailed description includes references to the accompanying drawings, which form a part of the detailed description. The drawings show, by way of illustration, specific embodiments in which the present subject matter can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the present subject matter should be determined with reference to the appended claims, along with the full scope of equivalents to which such claims are legally entitled.

What is claimed is:

1. A communication circuit comprising:
   a digital-to-time converter (DTC) configured to receive reference information, modulation information and first dither information, and to provide a modulated signal using the reference information, the modulation information and the first dither information;
   an accumulator coupled to the DIC and configured to integrate frequency sample information of the modulation information; and
   a processing path configured to receive second dither information and to cancel the first dither information using the second dither information,
   a reference generator configured to receive the second dither information and to provide the reference information with the second dither information to the DTC;
   wherein the first dither information is added as phase samples to the modulation information after the accumulator; and
   wherein the DTC is configured to disrupt processing periodicity of the communication circuit to reduce spur energy with the first dither information.

2. The communication circuit of claim 1, wherein the modulated signal is an output local oscillator signal having a frequency different from a frequency of the reference information.

3. The communication circuit of claim 1, wherein the processing path includes a quadrature transmission path configured receive the modulated signal as a local oscillator signal from the DTC and to mix quadrature communication data with the modulated signal to provide a radio frequency signal.

4. The communication circuit of claim 1, wherein the reference generator includes a phase-locked loop (PLL).

5. The communication circuit of claim 1, wherein the processing path includes a quadrature reception path configured receive the modulated signal as a local oscillator signal from the DTC and to extract quadrature communication data from a radio frequency signal using the modulated signal.

6. The communication circuit of claim 1, wherein the processing path includes a second DTC configured to receive an output of the DTC as second reference information.

7. The communication circuit of claim 1, including a dither information generator configured to generate the first dither information with non-constant instantaneous frequency.

8. The communication circuit of claim 1, including a dither information generator configured to generate the first dither information to include sinusoidal modulation information or pseudo-random, spectrally shaped phase or frequency modulation information.

9. A communication device comprising:
   a processing circuitry configured to provide first communication data and to receive second communication data;
   a dither information generator configured to generate first dither information; and
   a communication circuit further comprising:
   a digital-to-time converter (DTC) configured to receive reference information, to receive modulation information, to receive the first dither information and to provide a modulated signal using the reference information, the modulation information and the first dither information; and
   a processing path associated with the DTC and configured to receive at least one of the first communication data or the second communication data, to receive second dither information, and to cancel the first dither information using the second dither information,
   wherein the first dither information is configured to disrupt processing periodicity of the communication circuit, and
   wherein the processing path includes a reception path and wherein the reception path is configured to receive the modulated signal and to extract the second communication data from a received communication signal.

10. The communication device of claim 9, wherein the processing path includes a transmission path and wherein the transmission path is configured to receive a second modulated signal and to combine the first communication data with the second modulated signal to provide a transmission signal.

11. The communication device of claim 10, wherein the communication device is user equipment (UE) and the transmission signal is an OFDMA signal configured for transmission in a 3GPP LTE network.

12. The communication device of claim 10, wherein the communication device is a station (STA) and the transmission signal is an OFDMA signal configured for transmission in an IEEE 802.11 network.

13. The communication device of claim 9, further comprising one or more antennas configured to transmit the first communication data and to receive the second communication data.

14. A method of reducing spur energy of a modulated signal performed by communication circuitry, the method comprising:
   receiving reference frequency information at a digital-to-time converter (DTC);
   receiving modulation information at the DTC;
   receiving first dither information at the DTC;
   adding the first dither information to the modulation information as phase samples;
   providing the modulated signal using the reference information, the modulation information and the first dither information;
   receiving second dither information at a processing path coupled with the DTC;
   cancelling the first dither information using the second dither information,
   wherein receiving second dither information at the DTC includes receiving the second dither information at a reference generator, the reference generator configured to provide the reference information with the second dither information to the DTC from the reference generator; and
   wherein the DTC is configured to disrupt processing periodicity of the communication circuit using the first dither information.

15. The method of claim 14, wherein the processing path includes a quadrature transmission path and the method further comprises:
   receiving the modulated signal as a local oscillator signal from the DTC at the quadrature transmission path; and
   mixing quadrature communication data with the modulated signal to provide a radio frequency signal, wherein the mixing includes cancelling the first dither information using the second dither information.

16. The method of claim 14, wherein the processing path includes a quadrature reception path and the method further comprises:

receiving the modulated signal as a local oscillator signal from the DTC at the quadrature reception path; and extracting quadrature communication data from a radio frequency signal using the modulated signal, wherein the mixing includes cancelling the first dither information using the second dither information.

17. The method of claim 14, wherein the receiving second dither information at a processing path includes:

receiving the second dither information at a second DTC; and receiving an output of the DTC as second reference frequency information at the second DTC.

18. A communication circuit comprising:

a digital-to-time converter (DTC) configured to receive reference information, modulation information and first dither information, and to provide a modulated signal using the reference information, the modulation information and the first dither information;

a processing path configured to receive second dither information and to cancel the first dither information using the second dither information, wherein the DTC is configured to disrupt processing periodicity of the communication circuit to reduce spur energy with the first dither information; and wherein the processing path includes a quadrature transmission path configured receive the modulated signal as a local oscillator signal from the DTC and to mix quadrature communication data with the modulated signal to provide a radio frequency signal.

19. A communication circuit comprising:

a digital-to-time converter (DTC) configured to receive reference information, modulation information and first dither information, and to provide a modulated signal using the reference information, the modulation information and the first dither information;

a processing path configured to receive second dither information and to cancel the first dither information using the second dither information, wherein the DTC is configured to disrupt processing periodicity of the communication circuit to reduce spur energy with the first dither information; and wherein the processing path includes a quadrature reception path configured receive the modulated signal as a local oscillator signal from the DTC and to extract quadrature communication data from a radio frequency signal using the modulated signal.

* * * * *

UNITED STATES PATENT AND TRADEMARK OFFICE
CERTIFICATE OF CORRECTION

PATENT NO. : 9,800,439 B2  
APPLICATION NO. : 14/577885  
DATED : October 24, 2017  
INVENTOR(S) : Leistner et al.

Page 1 of 1

It is certified that error appears in the above-identified patent and that said Letters Patent is hereby corrected as shown below:

In the Claims

In Column 13, Line 8, in Claim 1, delete "DIC" and insert --DTC-- therefor

Signed and Sealed this
Twenty-eighth Day of May, 2019

Andrei Iancu
*Director of the United States Patent and Trademark Office*